US012603484B2

(12) United States Patent　　　　　(10) Patent No.:　　US 12,603,484 B2
Wu et al.　　　　　　　　　　　　　　(45) Date of Patent:　　　Apr. 14, 2026

(54) MEDIUM TO LARGE-SIZED CABLE PEELING DEVICE

(71) Applicant: North Weijiamao Power And Coal Co., Ltd., Ordos City (CN)

(72) Inventors: Xia Wu, Ordos City (CN); Zhenrui Wang, Ordos City (CN); Ming Chang, Ordos City (CN); Hongze Jiang, Ordos City (CN); Ruifeng Zhang, Ordos City (CN); Wei Liu, Ordos City (CN); Guijun Shi, Ordos City (CN); Qi Li, Ordos City (CN); Jiandong Qiao, Ordos City (CN); Changhong Fan, Ordos City (CN); Liang Pan, Ordos City (CN); Yongli Yu, Ordos City (CN); Yan Wang, Ordos City (CN); Hui Sun, Ordos City (CN)

( * ) Notice: Subject to any disclaimer, the term of this patent is extended or adjusted under 35 U.S.C. 154(b) by 350 days.

(21) Appl. No.: 18/500,090

(22) Filed: Nov. 1, 2023

(65) Prior Publication Data

US 2024/0291252 A1　　Aug. 29, 2024

(30) Foreign Application Priority Data

Feb. 27, 2023　(CN) ......................... 202310170714.6

(51) Int. Cl.
*H02G 1/12*　　　　　(2006.01)
(52) U.S. Cl.
CPC ......... *H02G 1/1256* (2013.01); *H02G 1/1265* (2013.01); *H02G 1/127* (2013.01)
(58) Field of Classification Search
CPC .... H02G 1/1256; H02G 1/1265; H02G 1/127;

H02G 1/005; H02G 1/12; H02G 1/1202; H02G 1/1204; H02G 1/1221; H02G 1/1224; H02G 1/1236; H02G 1/1241; H02G 1/1248; H02G 1/1253; H02G 1/1212;

(Continued)

(56) References Cited

U.S. PATENT DOCUMENTS

| | | | |
|---|---|---|---|
| 5,398,413 A　* | 3/1995 | Chen ..................... | H02G 1/1224<br>30/91.2 |
| 2013/0000128 A1* | 1/2013 | Johnston .............. | H02G 1/1239<br>83/13 |

(Continued)

FOREIGN PATENT DOCUMENTS

CN　　　112260150 A　*　1/2021　.......... H01B 15/006

*Primary Examiner* — Michael A Gump

(57)　　　　　ABSTRACT

Disclosed is a medium to large-sized cable peeling device, including a main component having a base, a cable support positioned on top of the base and a positioning frame positioned in the middle of the cable support; and a cutting assembly positioned below the positioning frame and in the middle of the cable support, the cutting assembly has an adjustment component positioned below the positioning frame, a cutting blade positioned at the bottom of the adjustment component, a locking component positioned inside the cutting blade and a rotating component positioned below the adjustment component and in the middle of the cable support. The invention achieves adjustment of cable peeling based on the thickness of the cable insulation by setting up a main component and a cutting assembly, which prevents damage to cable core during the cutting process and enables the blade to cut at an angle, thereby improving cutting efficiency.

9 Claims, 8 Drawing Sheets

(58) Field of Classification Search
CPC ..... H02G 1/1282; Y02W 30/82; B23D 21/00;
B23D 21/04; B23D 21/08; B23D 45/122;
B23D 45/126
USPC ............. 81/9.51, 9.4, 9.41–9.43; 30/93–102,
30/90.1, 90.3
See application file for complete search history.

(56) References Cited

U.S. PATENT DOCUMENTS

2021/0376581 A1 * 12/2021 Wang ................... H02G 1/1265
2022/0239078 A1 * 7/2022 Sorg ....................... H02G 1/127
2022/0399703 A1 * 12/2022 Liu ...................... H02G 1/1221

* cited by examiner

Cable

MEDIUM TO LARGE-SIZED CABLE PEELING DEVICE

CROSS-REFERENCE TO RELATED APPLICATIONS

This application claims priority from Chinese patent application number 2023101707146 filed on Feb. 27, 2023; the disclosure of which is incorporated herein by reference in its entirety.

FIELD OF THE INVENTION

The present invention relates to the technical field of cable processing. In particular, it relates to a medium to large-sized cable peeling device.

BACKGROUND OF THE INVENTION

For cutting the cable insulation, there are typically two methods: vertical cutting and ring cutting. Vertical cutting involves cutting along the axis of the cable and is typically used for recycling old cables. Ring cutting, on the other hand, involves cutting radially around the cable by encircling it, removing a portion of the insulation. This method is primarily used when making cable connections. Existing ring cutting methods mainly include manual cutting, but this method is inefficient and comes with high labor costs; mechanical cutting, but it may lack precision and can be somewhat crude, potentially leading to cable core damage, as well as requiring more sophisticated machinery. In view of this, a medium to large-sized cable peeling device is proposed for mechanical cutting methods. This device is capable of adjusting the cutting depth based on the thickness of the cable insulation, thus preventing damage to the cable core.

SUMMARY OF THE INVENTION

This section aims to summarize some aspects of the embodiments of the present invention and to briefly describe some preferred embodiments. Simplification or omission may be made in this section, the abstract of the specification, and the title to avoid obscuring the purposes of this section, the abstract of the specification, and the title. Such simplification or omission may not be used to limit the scope of the present invention.

The present invention is made in view of the problems existing in the above and/or existing medium to large-sized cable peeling device.

Hence, the problem that the present invention aims to address is how to resolve the issue of damaging the cable core, which is common in existing cable ring-cutting devices.

To solve the technical problems as above-mentioned, the present invention provides the following solutions: a medium to large-sized cable peeling device, including: a main component, where the main component includes a base, a cable support positioned on top of the base, and a positioning frame positioned in the middle of the cable support; and a cutting assembly positioned below the positioning frame and in the middle of the cable support, wherein the cutting assembly comprises an adjustment component positioned below the positioning frame, a cutting blade positioned at the bottom of the adjustment component, a locking component positioned inside the cutting blade, and a rotating component positioned below the adjustment component and in the middle of the cable support.

As a preferred embodiment of the medium to large-sized cable peeling device, where the adjustment component includes a sliding seat positioned directly below the top of the positioning frame and an adjustment seat positioned inside the sliding seat, and the adjustment seat slides in coordination with the sliding seat, and there is a continuous variable-diameter groove set along a curved arc direction inside the adjustment seat.

As a preferred embodiment of the medium to large-sized cable peeling device, where the adjustment component further includes a scale block positioned inside the variable-diameter groove, the scale block slides in conjunction with the adjustment seat and is fixed by bolts, and there is a locking groove at the bottom of the scale block.

As a preferred embodiment of the medium to large-sized cable peeling device, where the adjustment component further contains a reset spring positioned between the sliding seat and the positioning frame, and wherein two ends of the reset spring are fixedly connected to the sliding seat and the positioning frame, respectively.

As a preferred embodiment of the medium to large-sized cable peeling device, where the cutting blade includes a pressure block positioned at the bottom of the sliding seat, a knife handle positioned at the bottom of the pressure block and a blade positioned at the bottom of the knife handle, and wherein the inside of the knife handle is equipped with a chamber.

As a preferred embodiment of the medium to large-sized cable peeling device, where the locking component includes a locking rod positioned inside the chamber of the knife handle, the bottom end of the locking rod is equipped with a conical block, and one end near the conical block is fitted with external threads with a certain length, while the other end away from the conical block is fitted with a long spiral groove.

As a preferred embodiment of the medium to large-sized cable peeling device, where the locking component further contains a pressure lever positioned on one side of the locking rod, the bottom of the pressure lever is equipped with a cylinder placed inside the long spiral groove and sliding in conjunction with the long spiral groove, and wherein there is a release lever on the bottom of the other side of the pressure lever, the top of the pressure lever extends out the top of the pressure block.

As a preferred embodiment of the medium to large-sized cable peeling device, where the locking component further contains positioning blocks located inside the knife handle and on both sides of the conical block, and the positioning blocks engage in a rotational manner with the knife handle and make contact with and engage the conical block.

As a preferred embodiment of the medium to large-sized cable peeling device, where the rotating component includes a fixed bracket positioned between the cable support, one side of the fixed bracket is also equipped with several fixed pillars, and the fixed pillars are securely attached to the fixed bracket.

As a preferred embodiment of the medium to large-sized cable peeling device, where the rotating component further contains a wheel positioned between the fixed bracket, an outer edge of the wheel is equipped with serrations, and the wheel also has rotational grooves on both sides, the fixed pillars engage in a sliding manner with the rotational grooves, and wherein there is an output end with a motor that engages with the serrations on one side of the wheel.

The present invention has the following advantages: The present invention achieves the adjustment of cable peeling based on the thickness of the cable insulation by setting up a main component and a cutting assembly. This prevents damage to the cable core during the cutting process and also enables the blade to cut at an angle, thereby improving cutting efficiency.

BRIEF DESCRIPTION OF THE DRAWINGS

In order to more clearly illustrate the technical solutions of the embodiments of the present invention, the following will briefly introduce the drawings needed to be used in the description of the embodiments. Obviously, the drawings in the following description are only some embodiments of the present invention. For those of ordinary skill in the art, other drawings can be obtained based on these drawings without any creative labor, in which.

DETAILED DESCRIPTION

To make the above-mentioned objectives, features and advantages more easily be understood, the following detailed description of the embodiments of the present invention is provided in conjunction with the specification.

Although the following descriptions illustrate in detail in order to facilitate understanding of the present invention, it should be understood by a skilled person in the art that the present invention can also be enabled by other ways not described herein. The skilled person in the art can also implement the present invention without departing from the spirit of the present invention such that the following descriptions concerning the examples will not limit the present invention.

In addition, the expressions "an embodiment" or "an example" used herein refers to including specific features, structure and characteristics of at least one embodiment of the present invention. "According to an embodiment of the present invention" appears in the present disclosure does not necessarily mean that it refers to the same embodiment, or it does not necessarily mean that it independently or selectively contradicts with one another.

EXAMPLES

Example 1

Figure 1:
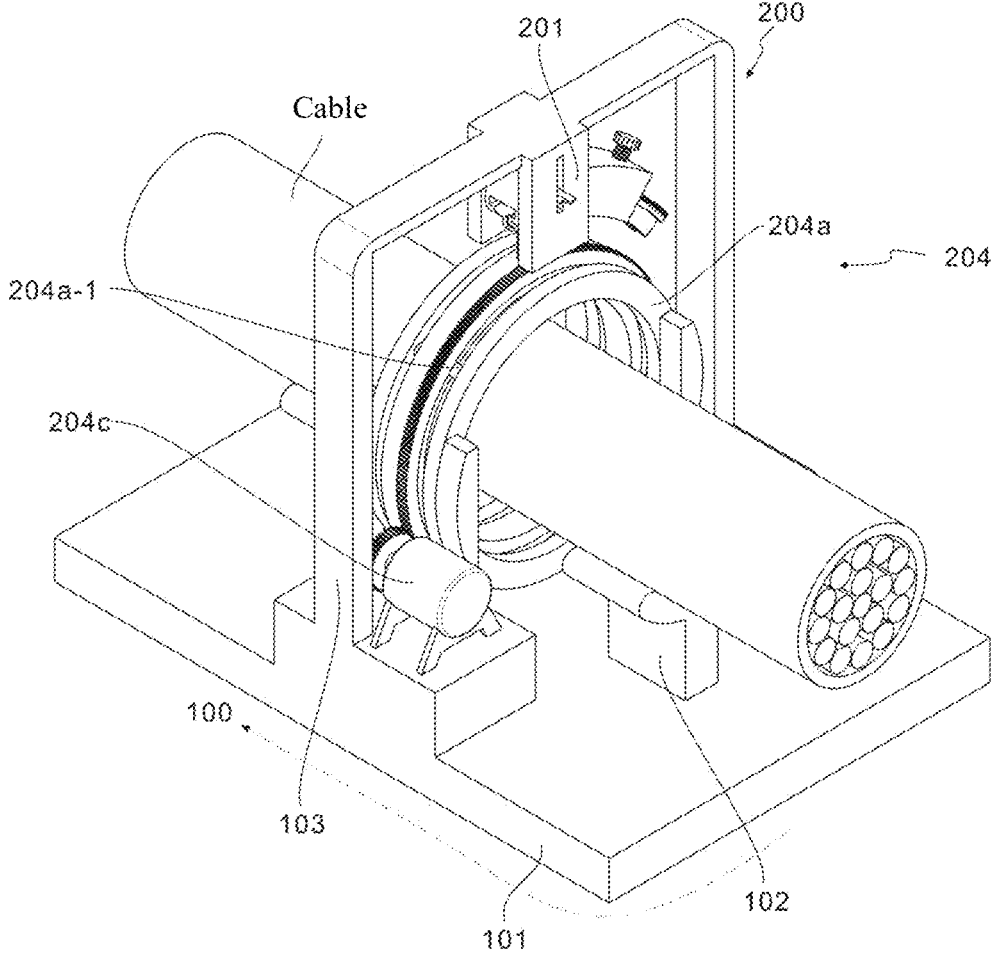
FIG. 1 depicts an application scenario of the medium to large-sized cable peeling device.
Figure 2:
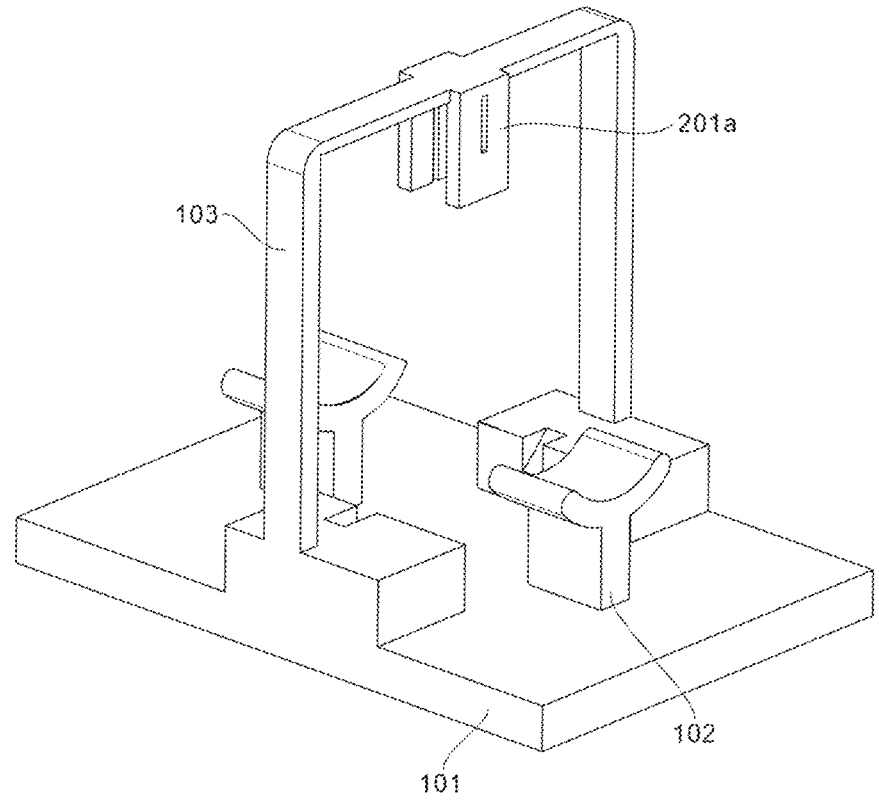
FIG. 2 depicts a structural schematic of the main component of the medium to large-sized cable peeling device.
Figure 3:
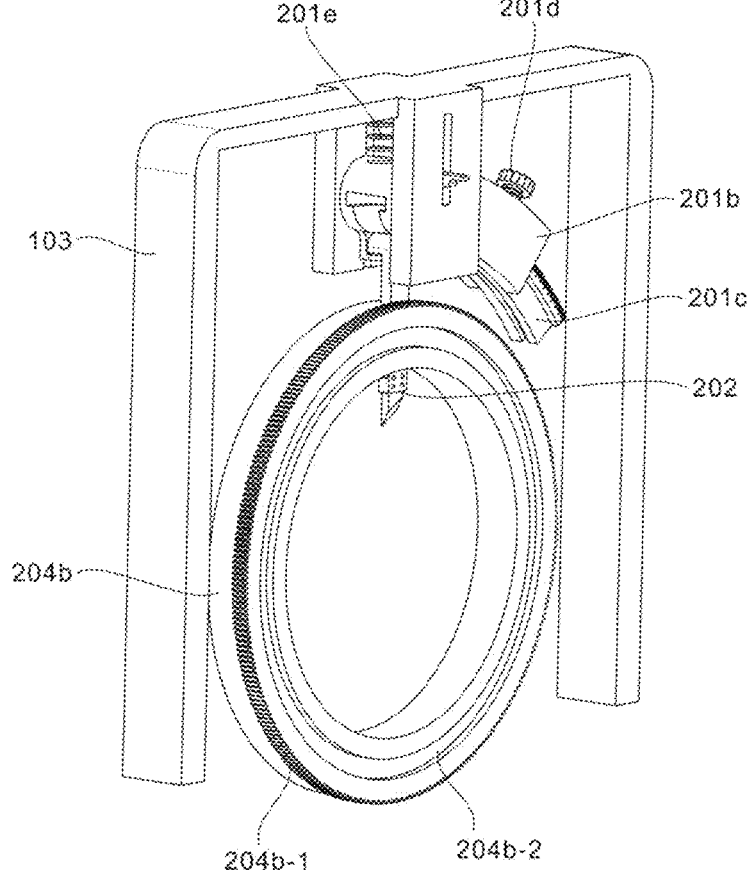
FIG. 3 depicts a structural schematic of the cutting assembly of the medium to large-sized cable peeling device.
Figure 4:
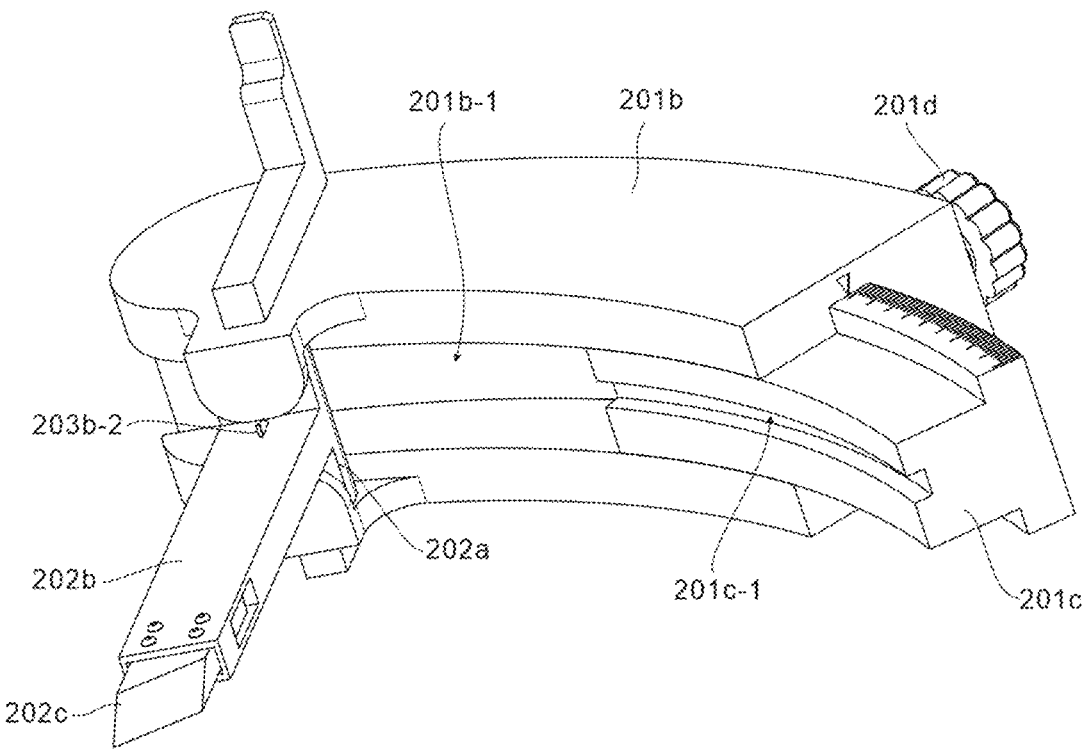
FIG. 4 depicts a partial structural schematic of the adjustment component and the cutting blade of the medium to large-sized cable peeling device.
Figure 5:
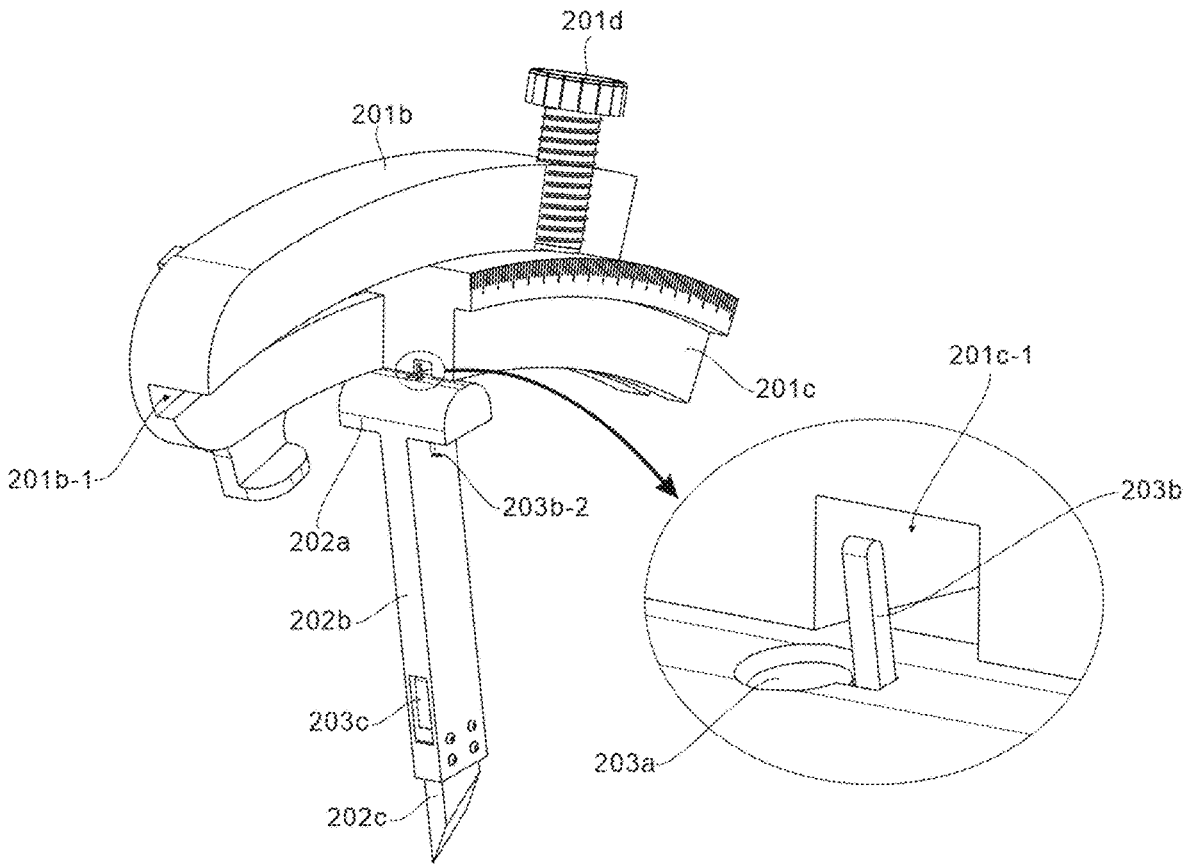
FIG. 5 depicts the cooperation between the adjustment component and the cutting blade inside the medium to large-sized cable peeling device.
Figure 6:
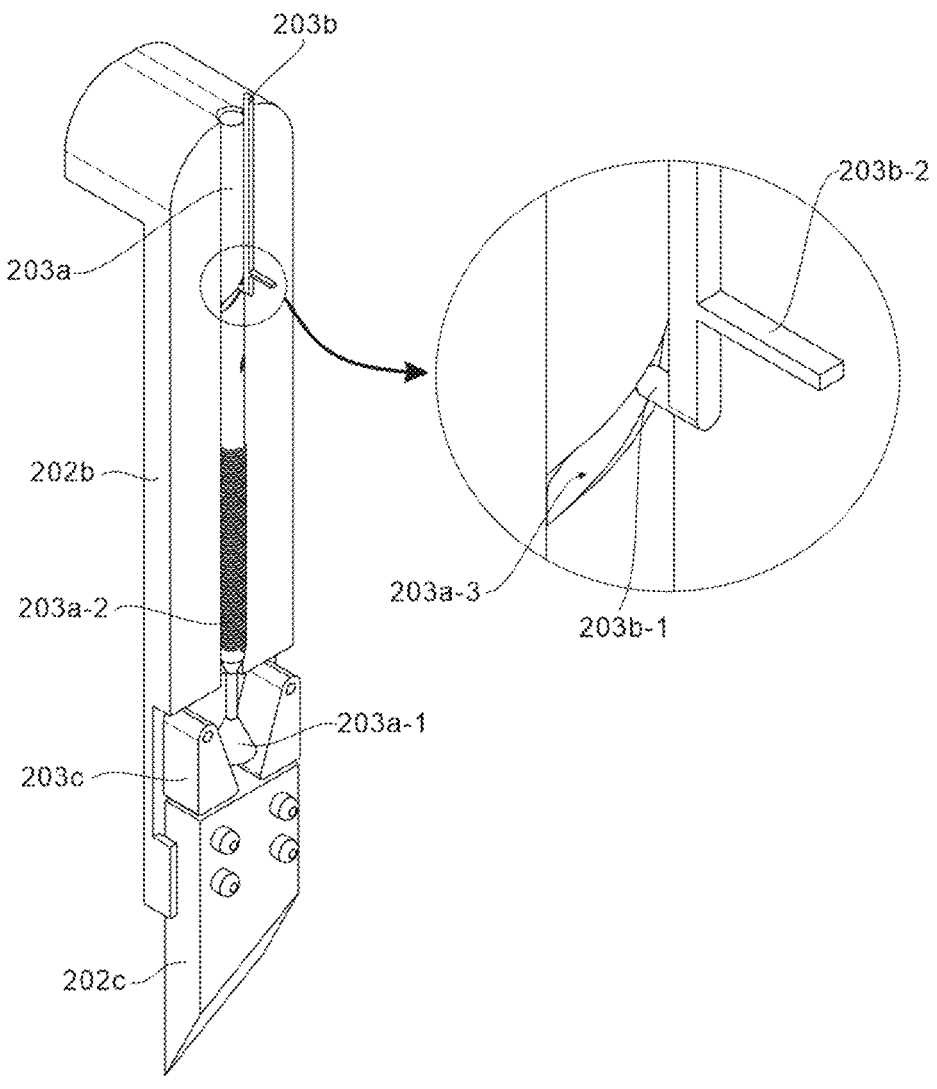
FIG. 6 depicts the structure of the locking component inside the cutting blade of the medium to large-sized cable peeling device, along with a partial magnified view.
Figure 7:
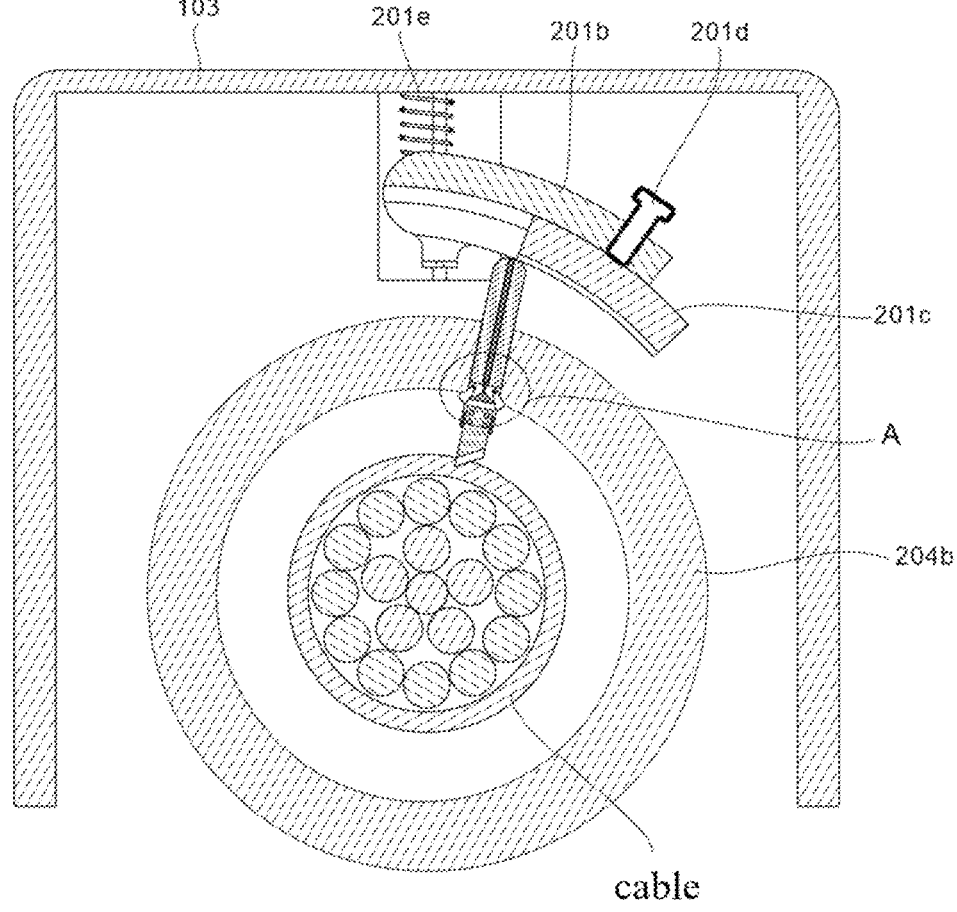
FIG. 7 depicts the state of the medium to large-sized cable peeling device at the beginning of the cutting process.
Figure 8:
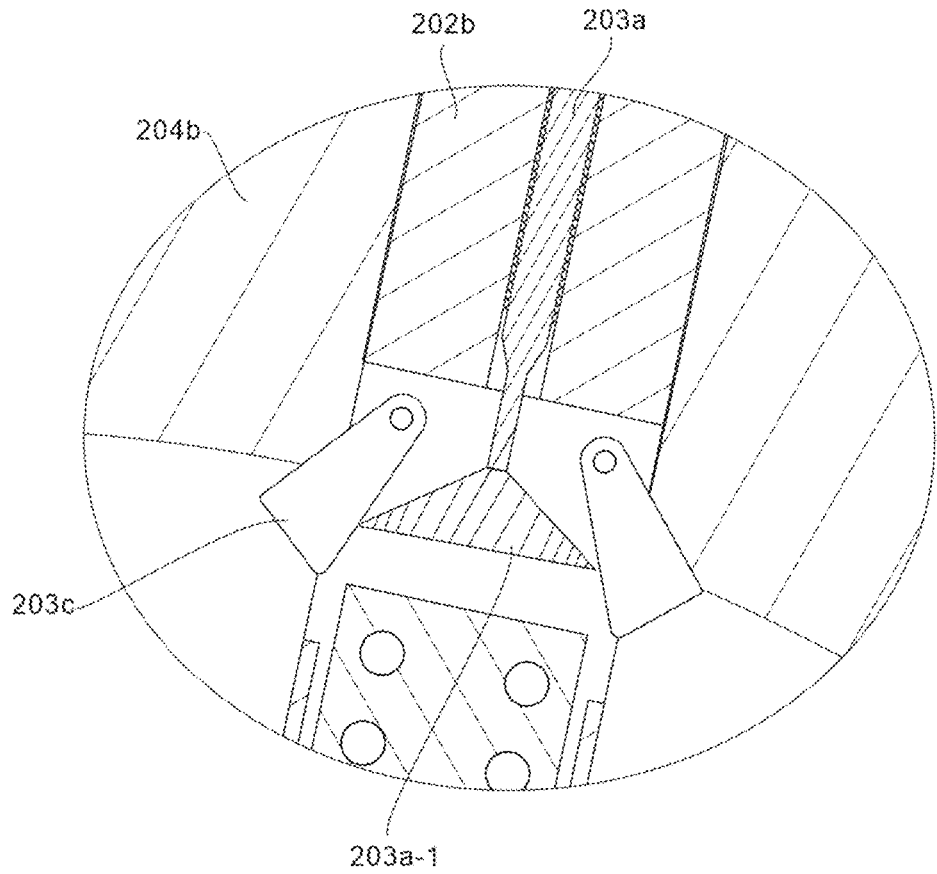
FIG. 8 is a structural schematic of the area marked as "A" in FIG. 7.

Referring to FIG. 1 and FIG. 2, which involve the first embodiment of the present invention. This embodiment provided a medium to large-sized cable peeling device, which included a main component 100 and a cutting assembly 200. Through the main component 100, the placement and clamping of the cable to be peeled were achieved. Then, through the cutting assembly 200, the cutting of the cable insulation was realized.

Specifically, the main component 100 included a base 101, a cable support 102 positioned on top of the base 101, and a positioning frame 103 positioned in the middle of the cable support 102. The base 101 could be either fixed to the ground or equipped with swivel casters at its bottom, allowing for easy mobility. There are two cable support 102, and their top ends had a semi-circular shape, allowing them to snugly fit against the outer surface of the cable. The positioning frame 103 was positioned at the center of the base and in the middle of the line connecting the two cable supports 102. It had a square shape with a certain height.

Preferably, the cutting assembly 200 was positioned below the positioning frame 103 and in the middle of the cable support 102. The cutting assembly 200 included an adjustment component 201 positioned below the positioning frame 103, a cutting blade 202 positioned at the bottom of the adjustment component 201, a locking component 203 positioned inside the cutting blade 202, and a rotating component 204 positioned below the adjustment component 201 and in the middle of the cable support 102. The adjustment component 201 slid in conjunction with the positioning frame 103, serving to adjust the height of the cutting blade 202. The cutting blade 202 was used to cut the outer insulation of the cable. The rotating component 204 could drive the cutting blade 202 to rotate, thereby performing ring cutting on the cable insulation.

During use, the cable was placed on the cable support 102, and then the adjustment component 201 was used to bring the cutting blade 202 into close contact with the cable's outer insulation. The adjustment component 201 could also adjust the cutting depth of the cutting blade 202. Afterward, the rotating component 204 was used to rotate the cutting blade 202, thereby performing a ring cut on the cable insulation.

Example 2

Referring to FIG. 2 to FIG. 8, which involve the second embodiment of the present invention. This embodiment was based on the previous embodiment.

Specifically, the adjustment component 201 included a sliding seat 201a positioned just below the top of the positioning frame 103 and an adjustment seat 201b positioned inside the sliding seat 201a. The adjustment seat 201b slid in conjunction with the sliding seat 201a. There is a continuous variable-diameter groove 201b-1 set along a curved arc direction inside the adjustment seat 201b. The sliding seat 201a was welded at the top center just below the positioning frame 103, and on its inside, two long grooves were provided, with the upper half of one of them extending to the outside. The adjustment seat 201b had an arc shape and was not concentric with the wheel 204b. The adjustment seat 201b had a tendency to gradually approach the wheel 204b. The cross-section of the variable-diameter groove 201b-1 was "T"-shaped.

Preferably, the adjustment component 201 further included a scale block 201c positioned inside the variable-diameter groove 201b-1, the scale block 201c slid in conjunction with the adjustment seat 201b and is fixed by bolts 201d, and there is a locking groove 201c-1 at the bottom of the scale block 201c. The surface of the scale block 201c had markings to indicate the cutting depth of the cutting blade 202. The scale block 201c also had an arc shape, and its curvature matched the curvature of the adjustment seat 201b. When the bolt 201d was loosened, the scale block 201c could slide within the adjustment seat 201b, and tightening the bolt 201d would secure the scale block 201c at a specific scale.

Preferably, the adjustment component 201 further included a reset spring 201e positioned between the sliding seat 201a and the positioning frame 103, and wherein two ends of the reset spring 201e were fixedly connected to the sliding seat 201a and the positioning frame 103, respectively. The reset spring 201e was a compression spring, which, on one hand, was used to secure the adjustment seat 201b and sliding seat 201a, and, on the other hand, provided a force to press the adjustment seat 201b and cutting blade 202 against the cable.

Preferably, the cutting blade 202 included a pressure block 202a positioned at the bottom of the sliding seat 201a, a knife handle 202b positioned at the bottom of the pressure block 202a and a blade 202c positioned at the bottom of the knife handle 202b. The inside of the knife handle 202b was equipped with a chamber. The top of the pressure block 202a had an arc shape and could be held by the adjustment seat 201b at the starting position. The pressure block 202a could slide within the variable-diameter groove 201b-1. The cutting blade 202c and the knife handle 202b were connected in a detachable manner, making it easy to replace the cutting blade 202c. The chamber inside the knife handle 202b had an opening towards the bottom, allowing it to be open to the outside. Additionally, the knife handle 202b was inserted on the circumference of the wheel 204b.

In the preferred configuration, the locking component 203 included a locking rod 203a positioned inside the chamber of the knife handle 202b. The bottom end of the locking rod 203a was equipped with a conical block 203a-1. One end near the conical block 203a-1 was fitted with external threads 203a-2 with a certain length, while the other end away from the conical block 203a-1 is fitted with a long spiral groove 203a-3. The locking rod 203a could be threadedly connected to the knife handle 202b via the external threads 203a-2. In other words, when the locking rod 203a rotated, it moved vertically inside the knife handle 202b.

In the preferred configuration, the locking component 203a further included a pressure lever 203b positioned on one side of the locking rod 203a. The bottom of the pressure lever 203b is equipped with a cylinder 203b-1 placed inside the long spiral groove 203a-3 and sliding in conjunction with the long spiral groove 203a-3, and there is a release lever 203b-2 on the bottom of the other side of the pressure lever 203b, the top of the pressure lever 202a extends out the top of the pressure block 202a. When the pressure lever 203b moved vertically, the cylindrical element 203b-1 would move within the long spiral groove 203a-3. Due to the effect of the inner wall of the long spiral groove 203a-3, the locking rod 203a would rotate.

In the preferred configuration, the locking component 203 further included positioning blocks 203c located inside the knife handle 202b and on both sides of the conical block 203a-1, and the positioning blocks 203c engaged in a rotational manner with the knife handle 202b and make contact with and engage the conical block 203a-1. The positioning blocks 203c had a right-angled triangular shape. The long side of the positioning blocks 203c made contact with the bottom of the conical block 203a-1. When the conical block 203a-1 moved downward, it would compress the positioning blocks 203c, causing them to rotate to the sides. As a result, part of the positioning blocks 203c would extend out of the knife handle 202b.

Furthermore, the rotating component 204 included a fixed bracket 204a positioned between the cable supports 102. One side of the fixed bracket 204a had several fixed pillars 204a-1. The fixed pillars 204a-1 were securely connected to the fixed bracket 204a. The fixed bracket 204a was welded to the base 101, primarily for the purpose of securing the wheel 204b.

Furthermore, the rotating component 204 also included a wheel 204b positioned between the fixed brackets 204a. An outer edge of the wheel 204b is equipped with serrations 204b-1, and the wheel 204b also has rotational grooves 204b-2 on both sides, the fixed pillars 204a-1 engage in a sliding manner with the rotational grooves 204b-2, and there is an output end with a motor 204c that engages with the serrations 204b-1 on one side of the wheel 204b. When the output end of the motor 204c rotated, it was responsible for driving the wheel 204b to rotate via the serrations 204b-1. The wheel 204b, in turn, drove the cutting blade 202 to rotate, consequently cutting the cable insulation.

During use, the cable to be stripped was first placed on the cable support 102 on top of the base 101. At this point, the cutting blade 202c, under the action of the reset spring 201e, would be pressed against the cable's outer insulation. Then, the operator could, based on the thickness of the cable insulation, loosen the bolt 201d and slide the scale block 201c to the desired scale position. Then, the motor 204c was run, and the wheel 204b began to rotate, which, in turn, drove the knife handle 202b to rotate. As the knife handle 202b started to rotate, its top pressure block 202a would slide along the bottom curve of the adjustment seat 201b and the scale block 201c. Since the curved surfaces of the adjustment seat 201b and scale block 201c gradually pointed towards the center of the wheel 204b, the pressure block 202a would gradually move towards the center of the wheel 204b. In other words, the knife handle 202b would move towards the center of the wheel 204b, causing the cutting blade 202c to advance as it rotated. The final depth of cut corresponded to the thickness of the cable insulation, which was indicated by the scale on scale block 201c.

Additionally, in order to prevent the pressure block 202a from retracting when it moved away from the scale block 201c, a pressure lever 203b was specially included. The top of the pressure lever 203b was positioned higher than the top of the pressure block 202a. When it rotated to the bottom of the scale block 201c, where the locking groove 201c-1 was located, the pressure lever 203b also started to be pressed and moved inward towards the knife handle 202b. At this point, the bottom cylindrical element 203b-1 would come into contact with the long spiral groove 203a-3 on the locking rod 203a, causing the locking rod 203a to start rotating. As the locking rod 203a began to rotate, it would move downward along with the conical block 203a-1, thanks to the action of its lower external threads 203a-2. Then, the conical block 203a-1 would start pressing against the two positioning blocks 203c, causing the two positioning blocks 203c to rotate outward and press against the inner circumference of the wheel 204b. This would prevent the knife handle 202b from moving upward any further. The action on the knife handle 202b ensured that it could only move forward and not retract, while also achieving continuous and stepless adjustment. In addition, it was worth noting that the range of movement of the knife handle 202b did not exceed the engagement distance between the perpendicular sides of the positioning blocks 203c. After the cutting was completed, the unlocking lever 203b-2 was lifted upward, allowing the locking rod 203a to reverse and move upward in the same way, causing the positioning blocks 203c to lose its obstruction and retract into the handle 202b. At that time, the handle 202b could move freely.

The present device enables a gradual approach to cable insulation stripping, as opposed to a direct approach, thereby extending the lifespan of the blade.

It is worth noting that the foregoing examples are only used for illustration of the technical solutions of the present invention and non-limiting thereto. Though reference is made to preferred examples for detailed illustration of the present invention, a skilled person in the art should understand that the technical solutions provided by the present invention can vary or be substituted by equivalents without departing from the spirit and scope of the technical solutions described herein, which should fall within the scope of the appended claims.

What is claimed is:

1. A cable peeling device, comprising:
   a main component, wherein the main component comprises a base, a cable support positioned on top of the base, and a positioning frame positioned in the middle of the cable support; and
   a cutting assembly positioned below the positioning frame and in the middle of the cable support, wherein the cutting assembly comprises an adjustment component positioned below the positioning frame, a cutting blade positioned at the bottom of the adjustment component, a locking component positioned inside the cutting blade, and a rotating component positioned below the adjustment component and in the middle of the cable support;
   wherein the adjustment component comprises a sliding seat positioned directly below the top of the positioning frame and an adjustment seat positioned inside the sliding seat, and wherein the adjustment seat slides in coordination with the sliding seat, and there is a continuous variable-diameter groove set along a curved arc direction inside the adjustment seat.

2. The cable peeling device of claim 1, wherein the adjustment component further comprises a scale block positioned inside the variable-diameter groove, the scale block slides in conjunction with the adjustment seat and is fixed by a bolt, and there is a locking groove at the bottom of the scale block.

3. The cable peeling device of claim 1, wherein the adjustment component further comprises a reset spring positioned between the sliding seat and the positioning frame, and wherein two ends of the reset spring are fixedly connected to the sliding seat and the positioning frame, respectively.

4. The cable peeling device of claim 3, wherein the cutting blade comprises a pressure block positioned at the bottom of the sliding seat, a knife handle positioned at the bottom of the pressure block and a blade positioned at the bottom of the knife handle, and wherein the inside of the knife handle is equipped with a chamber.

5. The cable peeling device of claim 4, wherein the locking component comprises a locking rod positioned inside the chamber of the knife handle, the bottom end of the locking rod is equipped with a conical block, and one end near the conical block is fitted with external threads with a certain length, while the other end away from the conical block is fitted with a long spiral groove.

6. The cable peeling device of claim 5, wherein the locking component further comprises a pressure lever positioned on one side of the locking rod, the bottom of the pressure lever is equipped with a cylinder placed inside the long spiral groove and sliding in conjunction with the long spiral groove, and wherein there is a release lever on the bottom of the other side of the pressure lever, the top of the pressure lever extends out the top of the pressure block.

7. The cable peeling device of claim 5, wherein the locking component further comprises positioning blocks located inside the knife handle and on both sides of the conical block, and the positioning blocks engage in a rotational manner with the knife handle and make contact with and engage the conical block.

8. The cable peeling device of claim 1, wherein the rotating component comprises a fixed bracket positioned between the cable support, one side of the fixed bracket is also equipped with several fixed pillars, and the fixed pillars are securely attached to the fixed bracket.

9. The cable peeling device of claim 8, wherein the rotating component further comprises a wheel positioned between the fixed bracket, an outer edge of the wheel is equipped with serrations, and the wheel also has rotational grooves on both sides, the fixed pillars engage in a sliding manner with the rotational grooves, and wherein there is an output end with a motor that engages with the serrations on one side of the wheel.

* * * * *